United States Patent [19]

Mitchell, deceased et al.

[11] Patent Number: 4,755,288
[45] Date of Patent: Jul. 5, 1988

[54] APPARATUS AND SYSTEM FOR MAGNETICALLY TREATING FLUIDS

[76] Inventors: John Mitchell, deceased, late of Palm Springs, Calif.; by Charles E. Ament, executor, 33 Pondview Rd., Rye, N.Y. 10580

[21] Appl. No.: 906,975

[22] Filed: Sep. 12, 1986

[51] Int. Cl.⁴ .................. C02F 1/48; B01D 35/06
[52] U.S. Cl. .................. 210/85; 55/100; 123/538; 210/149; 210/222
[58] Field of Search .................. 55/2, 100; 123/536–539; 210/85, 149, 222, 223, 695, 739, 742, 746

[56] References Cited

U.S. PATENT DOCUMENTS

| | | | |
|---|---|---|---|
| 3,349,354 | 10/1967 | Miyata | 210/222 |
| 3,923,660 | 12/1975 | Kottmeier | 210/222 |
| 4,146,479 | 3/1979 | Brown | 210/85 X |
| 4,201,140 | 5/1980 | Robinson | 210/222 |
| 4,216,092 | 8/1980 | Shalhoob et al. | 210/222 |
| 4,265,754 | 5/1981 | Menold | 210/695 |
| 4,278,549 | 7/1981 | Abrams et al. | 210/222 |
| 4,572,145 | 2/1986 | Mitchell et al. | 123/538 |

FOREIGN PATENT DOCUMENTS 2029580  3/1980  United Kingdom .............. 210/222

Primary Examiner—Richard V. Fisher
Assistant Examiner—W. Gary Jones
Attorney, Agent, or Firm—Grimes & Battersby

[57] ABSTRACT

A system for monitoring one or more factors relating to the strength of a magnetic field generated by a magnetic force field generator adapted to treat fluid flowing through a conduit. Sensors detect and respond to any change in the factor monitored and actuate means to effect a reversal of such change for maintaining the strength of the magnetic force field to within allowable limits. The system includes a multi-magnet magnetic field generator which generates a plurality of discrete magnet fields of reverse polarity positioned externally of the conduit for saturating the inner area of the conduit for treating fluid flowing through the conduit.

10 Claims, 2 Drawing Sheets

APPARATUS AND SYSTEM FOR MAGNETICALLY TREATING FLUIDS

BACKGROUND OF THE INVENTION

1. Field of the Invention

This invention relates generally to apparatus and a system for magnetically treating fluids.

2. Background

It is well known that magnetism has an effect on fluids such as gasoline, diesel fuel, home heating oil and water. For example, U.S. Pat. No. 4,572,145, which issued on Feb. 25, 1986 to the present applicants for Magnetic Fuel Line Device, teaches the use of a magnetic structure which is positioned adjacent a fuel line for creating a magnetic influence on the fuel conveyed therethrough to a fuel consuming apparatus.

Other such patents which relate to the treatment of fluids with magnetism include:

| U.S. Pat. No. | Patentee | Issue Date |
|---|---|---|
| 3,349,354 | Mijata | October 24, 1967 |
| 3,923,660 | Kottmeier | December 2, 1975 |
| 4,146,479 | Brown | March 27, 1979 |
| 4,216,092 | Shalhook et al. | August 5, 1980 |
| 4,265,754 | Minold | May 5, 1981 |
| 4,278,549 | Abrams et al. | July 14, 1981 |
| 4,366,053 | Findler | December 28, 1982 |

It is also known that magnets will lose their magnetic strength as the temperature increases. Tests have shown that for every degree Centigrade (C) increase over 20° C., there is a 0.15% decrease in magnetic strength. At 450° C., sometimes referred to as the Curie point, a permanent magnet loses substantially all of its magnetic strength. Much of this strength, however, is regained as the magnet cools. In some environments, such as in the engine compartment of an automobile or truck or in a boiler or steam generator, the temperature of the surrounding environment or atmosphere may rise to as much as 150° C. Such rise in temperature results in a loss of magnetic field energy or activity equal to:

$$\frac{(150 - 20) \times .15}{100} = 19.5\%$$

It will thus be appreciated that such loss of magnetic strength oftentimes severely limits the effectiveness of such magnetic devices.

SUMMARY OF THE INVENTION

The present invention comprises a multi-magnet magnetic force field generator positioned adjacent to or attached to the outside of a conduit through which flows a fluid. The multi-magnet magnetic force field generator creates a magnetic force field which is directed to and fills or saturates the inner area of the conduit through which the fluid to be treated flows. The multi-magnet magnetic force field generator includes a plurality of bi-pole magnets, with each magnet positioned external of and adjacent to the conduit. Each magnet of the generator is positioned so that the line between the north and south poles of the respective magnet is in axial alignment with the direction of fluid flow through the conduit so that the magnetic force field generated from or extending from one pole of each magnet respectively fills or saturates the internal or inner area of the conduit carrying the fluid.

In other words, the invention provides that the individual magnets of the multi-magnet magnetic field generator are positioned adjacent the conduit and oriented so that the lines passing through the north and south poles of each magnet are substantially transverse to the flow path of the fluid flowing through the conduit and the poles of each magnet are so positioned so that the magnetic field generated by one magnetic pole of each magnet saturates or fills the interior or inner area of the conduit. The magnetic force field generated by the multi magnet magnetic field generator is a composite magnetic force field. The magnets of the multi magnet magnetic field generator are so arranged, with respect to each other, that the magnetic force field generated by each magnet remains a discrete field, in juxapositioned relationship with the adjacent field created by the adjacent magnet so that an elongated, composite magnetic force field is formed comprising different magnetic polar sections, along the length of the field. The magnets of the generator are oriented, along the flow path of the fluid, so that the pole of each magnet directing its magnetic force field into the inner area of the conduit is of reverse polarity with respect to the pole of the adjacent magnet. The polarity of the projected magnetic force field of the first positioned magnet and of the last positioned magnet of the magnetic field generator are the same. Thus, as the fluid flows through the conduit and enters the magnetic force field the fluid will come under the influence of, for example, a discrete south pole generated magnetic field, generated by the first magnet of the magnetic field generator, and then will come under the influence of a discrete north pole generated magnetic field, generated by the second magnet of the magnetic field generator, and then will come under the influence of a discrete south pole generated magnetic field, generated by the third magnet in the plurality of magnets forming the multi-magnet magnetic field generator. Each subsequent magnet of the multi-magnet magnetic field generator is oriented so that its magnetic field is reversed in polarity with respect to its adjacent magnet. The first magnet in the generator and the last magnet in the generator contribute magnetic fields of like polarity to the magnetic force field generated.

In a preferred embodiment of the invention, the multi-magnet magnetic field generator includes three, successively spaced, bi-pole magnets in which each sequentially positioned magnet directs a discrete magnetic force of different polarity, with respect to its adjacent magnet, into the inner open area of a conduit through which flows a fluid. The magnetic fields generated by this plurality of magnets make up a composite magnetic force field which is multi-polar in that the polarity of the magnetic force field changes with distance through the field.

In such preferred embodiment, the first or upstream magnet introduces or projects a south pole magnetic field into the inner area of the conduit forming the first section of the sectionalized magnetic force field. The second magnet in sequence, which is positioned downstream from the first magnet, introduces or projects a north pole magnetic force field into the inner area of the conduit forming the second section of the sectionalized magnetic force field downstream from the first or south pole magnetic force field section. The third magnet in sequence, which is positioned downstream from the second magnet, introduces or projects a south pole magnetic force field into the inner area of the conduit, forming the third section of the total sectionalized magnetic force field, downstream from the second section of the magnetic force field. The total magnetic force field is so arranged so that fluid flowing through the conduit passes sequentially through discrete south, north and south magnetic force field sections of the magnetic force field generated by the magnetic force field generator.

It has been found that the magnetic field so generated can be used for treating petroleum base fluids such as gasoline, kerosene, diesel oil and fuel oil in advance of and just prior to combustion in or by a fuel consuming apparatus such as an internal combustion engine or an oil burner or other fuel burner, for example. Tests have shown that after such treatment there is a significant reduction in the amount of treated fuel required for combustion. The viscosity of the fluid treated is a function of the length of the magnetic force field used for treating the fluid and therefore a function of the size or length of the magnets used in the multi-magnet magnetic field generator. When the fluid treated is very light, such as alcohol, for example, a single magnet magnetic field generator may be used. When the fluid treated is heavier, such as gasoline, diesel fuel or home heating fuel a three magnet multi-magnet magnetic field generator is desired. Where heavier fluids are treated the size of the magnet unit may be increased so that the magnetic force field generated by the multi-magnet magnetic field generator may be longer in length and stronger in strength.

It has also been found that the magnetic field generated by a multi-magnet magnetic field generator can be used for treating water for human consumption and/or use, such as drinking, cooking, washing and cleaning, for example, and for commercial use such as in boilers, air conditioners, steam generators and the like. Tests have shown that after such treatment water is more palatable and has reduced surface tension. There is reduced sedimentation and reduced mineral deposition, scaling and rusting.

In a further embodiment of the present invention, a system is provided for constantly monitoring the magnetic field strength generated by a magnetic field generator for maintaining magnetic field strength within allowable limits by keeping the temperature of the magnetic field generator within allowable temperature limits. The generator may include a single bi-pole magnet or a plurality of bi-pole magnets, as described above. In such system, the strength of the magnetic field is monitored and, when a loss or reduction of magnetic activity or in magnetic strength is detected, due to a temperature increase, a cooling sub-system is activated to reduce the temperature of the magnet and return the magnetic field to at least the desired field strength. A system indicator and a minimum magnetic field strength or minimum magnet activity indicator are also provided.

OBJECTS OF THE INVENTION

It is therefore an object of the present invention to provide apparatus adapted to be positioned external of and adjacent to a conduit for generating discrete magnetic fields for treating fluid flowing through the conduit.

Another object of the present invention is to provide apparatus for treating a flowing fluid with a magnetic force field in which a plurality of discrete alternate polarity magnetic fields are directed into the inner area of a conduit for treating such fluid.

It is still another object of the invention to provide a system for preserving the integrity of magnetic fields used to treat fluid flowing through a conduit.

It is still a further object of the invention to provide a system for monitoring factors which relate to the strength of a magnetic field used to treat fluid flowing through a conduit and for reversing any change in the monitored factor for maintaining magnetic field strength within allowable limits.

These and other objects will become apparent from reading the detailed description of the invention with reference to the accompanying drawings in which:

DETAILED DESCRIPTION OF THE INVENTION

Figure 1:
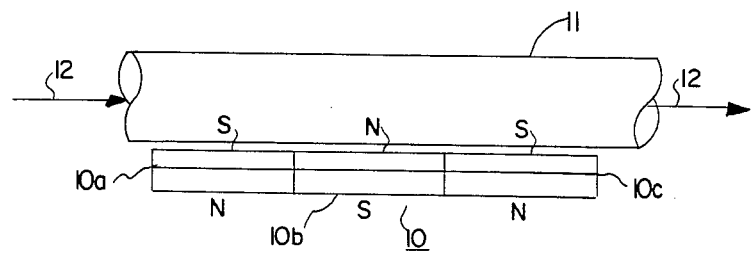
FIG. 1 illustrates the multi-magnet magnetic field generator of the present invention positioned adjacent a fluid carrying conduit.

FIG. 1 illustrates the multi-magnet magnetic force generator of the present invention, referred to generally by reference numeral 10, which includes a plurality of bi-pole magnets 10a, 10b and 10c. In a preferred embodiment the number of such magnets 10a-c is three. Magnetic field generator 10 is positioned on the outside of a conduit 11 which transmits fluid in a direction of flow indicated by arrow 12. The conduit may be a water line or supply for human or other animal consumption or the water line to a boiler or other water appliance or may be the fuel line of a fuel consuming device such as a gasoline engine, diesel engine, oil burner, natural gas burner, or the like.

The fluid may be a fuel transmitted by the conduit or fuel line from a tank or other storage means (not shown) to a fire or combustion chamber of a fuel consuming apparatus (not shown). The fluid may also be water in a water line of a system or in an apparatus using, heating or cooling water.

It is preferred that the first or most upstream magnet 10a be oriented such that its south pole S is positioned adjacent the conduit 11. In this manner, the upstream magnet 10a generates a south polar magnetic force field in the inner area of the conduit 11. The fluid flowing through the conduit 11 passes first through the south polar magnetic field generated by first magnet 10a.

The second magnet, 10b within the magnetic field generator 10 positioned downstream in flow from the first magnet 10a, is oppositely oriented from the first magnet 10a, such that its north pole N is positioned so as to generate a north magnetic force field in the inner area of the conduit 11. As such, the second magnet 10b serves to generate a north polar magnetic force field in the inner area of the conduit 10 adjacent to the south polar magnetic force field generated by the first magnet 10a and downstream in the direction of flow. The fluid, continuing in flow will exit from the south magnetic field and enter the north magnetic field and pass through the north magnetic field, generated by the second magnet.

The third magnet 10c, the most downstream of the magnets in the magnetic field generator 10, is oriented with its south pole positioned adjacent the conduit 11, thus generating a south polar magnetic force field within the inner or internal area of the conduit 11 adjacent to the north polar magnetic force field generated by the second magnet 10b and downstream in the direction of flow. The fluid, still continuing in flow, will exit from the north magnetic field and enter and pass through the south magnetic field generated by the third magnet and will exit the magnetic force field from the south magnetic field.

It will be appreciated that the magnetic field generator 10 may include any number of individual magnets, however, it has been found that the most optimal performance is achieved using three magnets sequentially oriented so as to generate separate or discrete magnetic force fields of sequentially opposite polarity. Similarly, it has been found that the specific order of the magnets, south/north/south in a downstream flow, produces the best results when treating petroleum base fluids and an order of north/south/north produces best results when treating water.

It has also been found that the strength of the magnetic field generator and, therefore, the size of the magnetic field generated, depends upon the internal diameter or width of the conduit. In order to treat all of the fluid passing through that area of the conduit, the magnetic field generator must be sufficiently strong to be able to generate a magnetic force field which covers or saturates the entire inner area of the conduit adjacent the magnetic field generator. As the fluid becomes more viscous, it is desirable to increase the length of the magnetic field along the conduit. It has been found that the magnetic force field may be lengthened by using larger magnet units so that the individual magnetic fields generated by the respective magnets are longer magnetic fields.

The magnetic field generator 10 is adapted to be used in conjunction with conduits 11 adapted to convey petroleum based fuels such as gasoline, kerosene and diesel and fuel oil to burners or engines (not shown). In such instances, it has been found that the use of such magnetic field generators to treat such fluid with a magnetic field force, results in substantially reduced consumption of the gasoline, oil or other fuel required by the burners or engines and lower emissions from combustion.

The magnetic field generator may also be used effectively for the treatment of water, particularly to retain the minerals and other particulate matter in suspension. When water containing hardness salts is passed through such a magnetic force field, the electrochemical nature of the ions is changed so that precipitation occurs in a different way than experienced with untreated water. Crystallization takes place on multiple nuclei in the body of the solution, producing a sludge instead of the precipitate growth on the walls of tubes, pipes, storage tanks, heaters, etc., or forming a rock-hard scale which occurs with untreated water. As such, use of the magnetic field generator has been found to be effective for reducing the surface tension of water. In addition, water has been made more palatable to persons for drinking and cooking and surface tension has been reduced increasing the cleaning and solvent properties of the water.

The magnetic field generator 10 of the present invention operates in the following manner:

Fluid flowing through the conduit 11 passes through the discrete magnetic fields generated by the multi-magnet generator 10. The fluid is first influenced magnetically by or is subjected to a south pole magnetic field, then a north pole magnetic field and then a south pole magnetic field. As the fluid flows through the conduit 11 and passes through the composite magnetic field the fluid is successively subjected to discrete, opposite magnetic fields which cause a swirling action in the atomic structure of the fluid causing the atoms in the fluid to become aligned and thereafter flow in uniform molecular flow.

When the fluid is a petroleum based fuel, friction and ultimate consumption are reduced. The effect of reduced friction permits a better air/fuel mixture thus causing more efficient combustion. Further, it has been found that better air/fuel mixture results in a more complete burning engine with less emissions in the exhaust. When the fluid is water, drinking water becomes more palatable and, in addition, the particulate matter contained therein tends to remain in suspension or sludge form, thereby minimizing eventual precipitation. The surface tension of the water is also reduced, resulting in increased cleaning and solvent properties.

Figure 2:
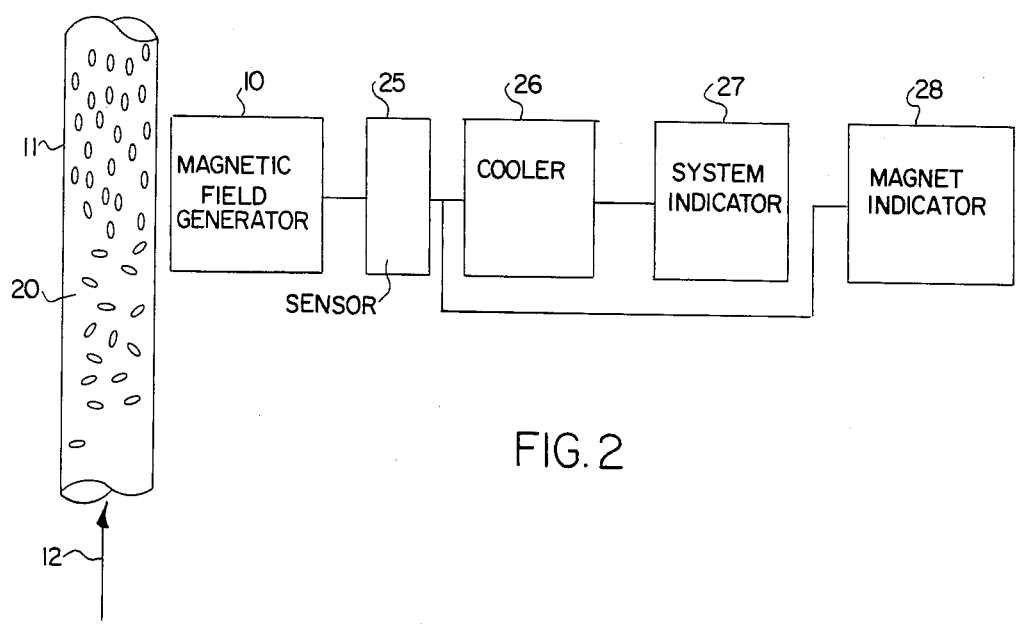
FIG. 2 is a block diagram of the system of the present invention.

The block diagram in FIG. 2 represents the system embodiment of the invention in which a fluid 20 flows through a conduit 11 in the direction of arrow 12 and is treated by the magnetic field generated by magnetic field generator 10. Block 10 represents the magnetic field generator which may take the form of the multi-magnet magnetic field generator 10 as described with reference to FIG. 1. Alternatively, it may comprise a single permanent magnet or an electromagnet driven by a direct current (DC) source. The north and south poles of each magnet of the magnetic field generator 10 are oriented so as to be perpendicular to the direction of fluid flow 12. Thus, the magnetic force field created by the magnetic field generator 10 is generally transverse to the direction of fluid flow 12 and positioned within the inner area of the conduit containing the fluid. Preferably the conduit is non-magnetic, however, this is not required. The conduit 11 represents any fuel line, supply line, pipe or any conduit carrying a fluid.

A sensor, indicated by block 25, is adapted to monitor the strength of the magnetic field generated by the magnetic field generator 10. The sensor 25 may monitor the magnetic force field, which, as discussed above, loses strength as the temperature of the magnet rises above 20° C. The sensor 25 may, if desired, also monitor the surrounding air or surface temperature since increase in temperature over 20° C. is directly related to reduction in field strength of the magnet.

When monitoring the magnetic force field generated by magnetic field generator 10, the sensor 25 may be biased so as to be actuated upon a predetermined loss in magnetic field strength, or upon the strength of the magnetic field being reduced to a minimum strength. Alternatively, when monitoring air or surface temperature, the sensor may be adjusted so that it becomes actuated by the temperature upon the temperature reaching a predetermined temperature value. Upon actuation, the sensor 25 causes a cooler 26 to be activated to thereby effect a reduction in temperature of the magnetic field generator 10. This may be accomplished by cooling the ambient so that the ambient cools the magnetic field generator or by cooling the magnetic field generator directly.

A systems indicator 27 may also be used to indicate that the cooling operation has gone into effect and a magnetic indicator 28 may be employed as an alarm to indicate that the magnetic field strength has decreased to a strength below a desired minimum strength.

Figure 3:
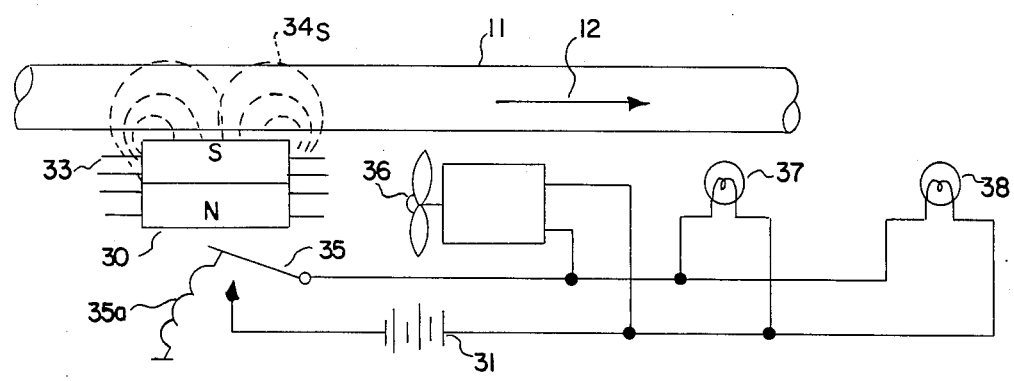
FIG. 3 represents a preferred form of the system of the present invention using a magnetic field generator including a single magnet with a magnetic field sensor.

FIG. 3 represents a preferred embodiment of the system wherein the magnetic field generator includes a single magnet 30 which is positioned adjacent a conduit 11. Cooling fins 33, preferably copper or aluminum fins, are provided on the magnet 30. The conduit is preferably fabricated from a non-magnetic material such as plastic, rubber, cooper or aluminum, although in successful tests some test vehicles had fuel lines fabricated from magnetic material, such as steel.

The magnetic field sensor is represented as a movable contact 35 which is biased by a spring 35a. The movable contact 35 is made of a magnetic material which is held in an open position for so long as the magnetic field strength of the magnet 30 exceeds the bias of the spring 35a. When the strength of the magnetic field is reduced, as a result of a rise in the temperature of the magnet 30, the spring 35a overcomes the magnetic force and the spring 35a closes the contact 35. Closure of the contact 35 completes an electric circuit which activates the cooler 36 (as represented as a motor driven blower). The circuit also includes a system indicator lamp 37 which, when illuminated, indicates that the cooling device 36 is operating.

The blower or fan 36 may be ducted to blow outside air on the cooling fins 33 of the magnet 30. In other cases, the cooler 36 may take the form of cowling fins which are opened to cool off the environment. In cases of extreme temperature rises, the cooler 36 may take the form of an air conditioner or air refrigeration unit with a blower for directing and blowing cooled air onto the magnet cooling fins 33. The power to drive the fan motor may be a battery 31 or some other source of power.

Closure of contact 35 also completes a circuit to illuminate indicator 38. This may serve as a warning light that the magnetic field strength of the magnet 30 has fallen below some predetermined level. The broken lines 34s extending from the magnet 30 and projecting into the inner or fluid carrying area of the conduit 11, represent lines of magnetic force or the magnetic flux field from the south magnetic pole of the magnet 30.

Figure 4:
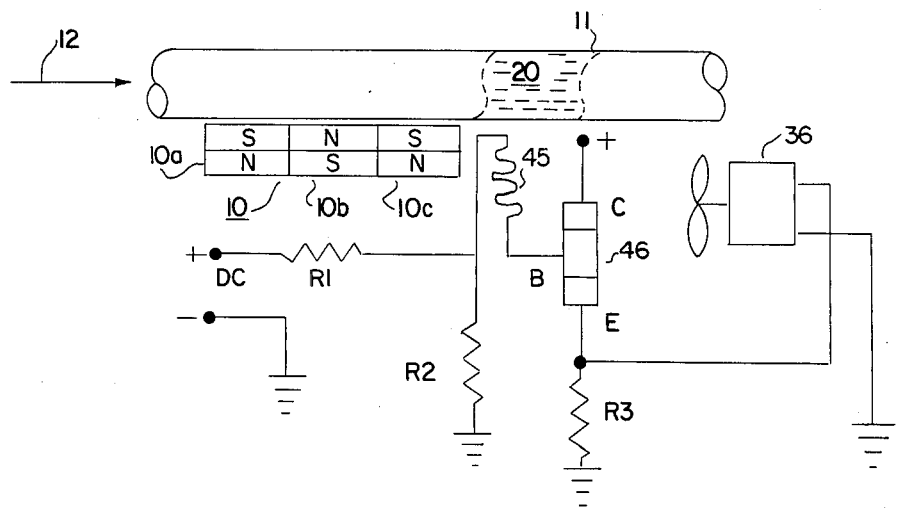
FIG. 4 represents an alternate form of the invention employing a magnetic field generator having a plurality of bi-pole magnets with an ambient temperature sensor.

FIG. 4 represents an alternate embodiment of the system wherein a multi-magnet magnetic field generator 10 of the type illustrated in FIG. 1 is positioned adjacent a conduit 11. The magnets 10a-c comprising magnetic field generator 10 may have cooling fins, as represented in FIG. 3.

In this embodiment, the sensor is in the form of a solid state device, such as a thermistor 45, which is characterized by lowering or reducing its electrical resistance as the temperature of the solid state device increases or rises. A rise or increase in the temperature of the thermistor will be caused by a rise or increase in the temperature of the surrounding atmosphere in which the thermistor 45 is located. The thermistor 45 is electrically connected into a circuit including a transistor 46 and the combination of the thermistor 45 and transistor 46 forms a heat sensitive switch which turns on the motor of blower or fan 36 when the temperature reaches a predetermined value.

The heat sensitive switching circuit includes a direct current (DC) power supply and a potential divider, resistors R1 and R2. Thermistor 45 is connected between the junction of the potential divider resistors and the base B of transistor 46. At normal operating temperature, i.e. at 20° C. and below, the magnetic field strength of the magnets 10a-c is at full strength. At 20° C. or below, as established by the characteristics of the thermistor 45, the resistance of thermistor 45 will be sufficient to keep the potential applied to the base, B of the transistor 46 at a sufficiently low value to keep the transistor shut off, thus keeping the transistor in open-switch condition. When the ambient temperature rises to some predetermined value above 20° C., the resistance of thermistor 45 decreases to a value where the potential applied to the base, B is of sufficient value to turn on the transistor 46 thus driving the transistor to a closed-switch condition. The collector C is connected to the positive terminal of the DC supply and the emitter E is connected to the return or ground through resistor R3. The motor of blower or fan 36 is connected to the junction of emitter E and resistor R3 so that when the transistor 46 turns on, substantially full potential is applied to the motor driven fan or blower 24, thus driving the fan or blower. This solid state switching circuit is only representative of solid state switching circuits and other forms of thermal responsive solid state switching circuits may be used if desired.

When the ambient temperature drops, the resistance of the thermistor 45 increases, thereby reducing the potential applied to the base B. When the base potential is lowered sufficiently, the transistor 46 turns off thereby turning off the fan or blower 36. The heat sensitive switch may be contained on a microchip and located conveniently adjacent or close to the magnets of the magnetic field generator. It will also be apparent that the heat sensitive switch may take the form of a bi-metal heat sensitive switch or some other thermostat device.

It will be appreciated that the system represented in FIG. 3 includes a sensor which monitors and responds to the magnetic field generated by the magnet 30. That is, when the strength of the magnetic field is of predetermined minimum value or above minimum value, the switch 35 is held open. When the strength of the magnetic field falls below a predetermined minimum strength, the biasing spring overcomes the magnetic attraction of the field and closes the contact 35.

In the system represented in FIG. 4, a sensor is represented which monitors and responds to the temperature of the magnetic field generator or of the environment in which the magnetic field generator is located. When the monitored temperature increases above a predetermined value, the sensor responds to such increased temperature by turning on. When the temperature decreases to below a predetermined value from such higher temperature value, the sensor responds by turning off.

These two systems are comparable because loss in magnetic field strength is directly related to the increase in temperature of the magnetic field generator once its temperature reaches 20° C. Below 20° C., the magnetic field strength of a magnet will remain at 100% of its established magnetic strength. The percentage of change in strength of the magnetic field of a magnet is a function of change in temperature above 20° C. As the temperature of the magnet increases over 20° C. the strength of the magnetic field decreases. As the temperature decreases toward 20° C., the magnetic field strength is gradually restored, provided, however, that the magnet was not exposed to such a high temperature that its magnetic properties were destroyed.

EXAMPLE 1

In order to demonstrate the effect of using the magnetic field generator of the present invention with internal combustion engines, a multi-magnet magnetic generator, such as described herein, was attached to the fuel line of the following three vehicles and each of the vehicles was tested in accordance with the following procedure. The vehicles tested were Heavy-Duty Diesel earth/rock moving equipment. The base period without application of the magnetic field generator lasted ten weeks. During this time the Baseline GPH (gallons per hour) was established. A magnetic field generator was then secured to the fuel line of each vehicle, in accordance with the qualifications set for the above, and a break-in or adjustment period of ten weeks was permitted. The test with the magnetic field generator secured to the engine fuel line was then conducted for twenty-four weeks with the following results.

| Vehicle | Baseline GPH | Test GPH | Impr. | Test Fuel Consumed | Gallons Saved |
|---|---|---|---|---|---|
| Cat Haul Truck V-8 Cat Engine | 5.98 | 5.35 | 10.5% | 5029 | 528 |
| Cat Haul Truck V-8 Engine | 6.04 | 5.38 | 10.9% | 2459 | 268 |
| Terex Loader Detroit Engine | 8.80 | 7.55 | 14.2% | 7863 | 1116 |

EXAMPLE 2

The following tests were run using the magnetic field generator of the present invention on five police cars for a period of over seven (7) months and over a total of 186,324 miles driven. The results were as follows:

| Vehicle | Baseline MPG | Test MPG | Percent Savings |
|---|---|---|---|
| 1401 | 9.77 | 10.39 | 6.3% |
| 1411 | 8.49 | 9.56 | 12.6% |
| 1413 | 10.44 | 11.27 | 8.0% |
| 1420 | 8.65 | 10.08 | 16.5% |
| 1423 | 9.30 | 10.03 | 7.8% |

MPG = miles per gallon.

EXAMPLE 3

The following tests were run using a magnetic field generator of the present invention on well water used by humans for consumption, i.e., drinking and cooking, and for home use. Prior to the installation of a magnetic field generator on the water line of well water, the water had a very bad taste and there was excessive scale buildup on the interior walls of the water lines. Free scales were filtered from the water by use of water filters and faucet screens. The water was classified as "hard" water. A magnetic field generator of the present invention was installed on the water line just prior to a dual water filter system which filter had been in constant, continuous use in the water line.

The first magnetic field generator to be installed on the water line was a multi-magnet magnetic field generator with the poles of its magnets oriented so as to direct a magnetic force field of discrete south/north/south magnetic field forces into the inner area of the water line. The water became more palatable but scale remained a problem. After sixty (60) days, the first magnetic field generator was removed and a second multi-magnet magnetic field generator was installed in the same place on the water line. The magnets of the second multi-magnet magnetic field generator were oriented so as to direct a magnetic force field of discrete north/south/north magnetic fields into the inner area of the water line. The taste of the water further improved and loose scale started to appear on the upstream side of the screens of the faucets downstream for the magnetic field generator. The descaling continued for several months then finally stopped. It was found that the interior surface of the water line, which prior to installation of the magnetic field generator was covered with scales and required a dual water filter system to control scales in the water, was scale free below the point of installation of the magnetic field generator and no long required a filter system to remove scales. The water at the faucets, after passing through the magnetic field of the magnetic field generator is scale free, tastes good and is more acceptable to soap resulting in less soap needed for washing.

EXAMPLE 4

The following tests were run on water having high iron content. The buildup of rust sluge was a problem in water filters and water holding tanks. The filters clogged very rapidly requiring constant periodic cleaning. Cleaning was difficult and had to be done often. The interiors of two ceramic water holding tanks were covered with a heavy rusty coating.

Water filters were cleaned and a multi-magnet magnetic field generator of the present invention generating discrete north/south/north magnetic fields was installed on a non-magnetic section of water line upstream of the clean filter. The test lasted for six months. During the test period the filter filtering treated water clogged less often, remaining useful between cloggings for a longer period of time and the filters were easier to clean.

Two ceramic water holding tanks in the system were inspected and it was found that the interior of each tank was coated with a heavy rusty coating. Both ceramic tanks were completely cleaned and a magnetic field generator of the present invention was installed on the water line inlet to one of the tanks, A and the tank was subjected to normal usage. The other tank, B, received no magnetic field generator at its inlet and was subjected to normal usage. The magnetic field generator used in the test created a magnetic field of discrete north/south/north polarity through which the water entering ceramic tank A passed. After a six-month period of normal use, tank A was fully inspected and the inside of the tank was found to be free of rust buildup. In tank B, rust buildup was noticed after one week into the test period and rust buildup in tank B continued all during the test period.

EXAMPLE 5

Tests were performed on an oil fired water heater. Incoming water to a hot water heater was pre-heated to 100° F. The thermostat setting of the hot water was set to maintain the heated water at 180° F. The heating unit was an oil burning heater. A base line for oil consumption was established under normal usage, without installation of the present invention on the fuel line of the oil burning heater. After the base line test, a magnetic field generator, such as described herein, was attached to the fuel line of the oil burning heater in the manner described herein. The results were as follows:

|  | Water | Oil |
|---|---|---|
| Without Installation of the Present Invention | | |
| Meter reading at start of test: | 37.1 | 21.92 |
| Meter reading at close of test: | 314.7 | 30.18 |
| Gallons consumed: | 277.6 | 8.26 |
| With Installation of the Present Invention | | |
| Meter reading at start of test: | 314.7 | 30.18 |
| Meter reading at close of test: | 592.5 | 35.70 |
| Gallons consumed: | 277.8 | 5.52 |
| Cost of fuel: | $1.00/gallon | |
|  | Without Invention | With Invention |
| Cost of fuel consumed: | $8.26 | $5.52 |
| Cost to heat one gallon of hot water: | $.02975 | $.01987 |
| Saving in fuel costs of hot water produced: |  | $2.74 |
| Percentage of savings in fuel: |  | 33.2% |

EXAMPLE 6

Tests were performed on a domestic forced air heating system with atmospheric gas (natural gas) burner. Three tests were performed, each test on the same heating system installed in the same house, each test lasting 24 hours. The first test, test #1, was performed without installation of a magnetic field generator on the fuel line of the heating unit. Tests #2 and #3 were performed with a magnetic field generator, the same device as described herein, installed on the fuel (natural gas) line of the heating unit. The results were as follows:

|  | Test #1 | Test #2 | Test #3 |
|---|---|---|---|
| Duration: | 24 hours | 24 hours | 24 hours |
| Gas meter reading at start: | 09710 | 09736 | 09789 |
| Gas meter reading at end: | 09736 | 09755 | 09804 |
| Total gas consumption: | 26 m$^3$ | 19 m$^3$ | 15 m$^3$ |
| Less domestic hot water: | 5 m$^3$ | 5 m$^3$ | 5 m$^3$ |
| Gas consumed for heating: | 21 m$^3$ | 14 m$^3$ | 10 m$^3$ |
| Outdoor temperature: | −12.3° C. | −8.2° C. | −0.7° C. |
| Indoor temperature: | 22.° C. | 22.° C. | 22.° C. |
| Degree days: | 30.3 | 26.2 | 18.7 |

During test #1, without the magnetic force field generator of the present invention installed on the heating system, the gas consumption per degree day equals:

$$21 m^3 - 30.3\ DD = 0.6930693 m^3/DD$$

During test #2, with a magnetic field generator of the present invention installed on the fuel (natural gas) line of the heating system, the gas consumption per degree day equals:

$$14 m^3 - 26.2\ DD = 0.5343511 m^3/DD$$

During test #3, with a magnetic field generator of the present invention installed on the fuel (natural gas) line of the heating system, the gas consumption per degree day equals:

$$10 m^3 - 18.7\ DD = 0.5347593 m^3/DD$$

As between test #1 and test #2 there was a reduction in consumption of natural gas fuel by 0.1587182m$^3$ or 22.9% per degree day. As between test #1 and test #3 there was a reduction in consumption of natural gas fuel by 0.15831m$^3$ or 22.84% per degree day.

Although specific examples of fluids, both liquids and gas, are mentioned herein as fluids which may be treated by a magnetic force field of a magnetic field generator such as disclosed and described herein, limitation to such fluids is neither implied nor intended, as other fluids such as, for example, freon, propane, liquified coal, powdered coal and other fluids may also be treated by a magnetic field generator such as described and disclosed herein and thereby obtain more work or energy or efficiency from the fluid and/or thereby increase the properties of the treated fluid.

Having thus described the invention with particular reference to the preferred forms thereof, and alternate arrangements, other changes and modifications may be made, as will be apparent to those skilled in the art without departing from the spirit and scope of the invention as defined by the appended claims.

What is claimed is:

1. A system for treating fluid as said fluid flows through the inner portion of a conduit with a magnetic force field, said system including:
    (a) means for generating a magnetic force field in said conduit including at least a first magnet, a second magnet and a third magnet oriented, respectively, to introduce into the inner portion of said conduit a discrete south magnetic field, a discrete north magnetic field, and a discrete south magnetic field;
    (b) sensor means responsive to a change in value characterized by a reduction in strength of the magnetic force field generated by said means for generating; and
    (c) means responsive to said sensor means for reversing said change in said value characterized by restoration of said strength of said magnetic field generated by said means for generating.

2. The system of claim 1, in which said means for generating is a multi-magnet magnetic field generator which is positioned external to and adjacent of said conduit and oriented so that the magnetic force field generated by said generating means extends into the inner area of said conduit transverse to the direction of fluid flow.

3. The system of claim 1, in which said sensor means includes switch means in an electric circuit, said switch means responsive to said magnetic force field and biased to close upon a predetermined reduction in the strength of said magnetic force field and in which said electric circuit includes said means responsive to said sensor means.

4. The system of claim 3, in which the reduction in the strength of said magnetic force field is related to an increase in temperature of said means for generating and wherein said means responsive is a cooling means for reducing the temperature of said means for generating.

5. The system of claim 4, wherein said sensor means includes heat sensitive switch means which closes in response to a predetermined increase in temperature and wherein said means responsive to said sensor means includes cooling means for reducing said temperature for restoring the strength of said magnetic force fields.

6. The system of claim 5 and in which said heat sensitive switch means is a thermistor and a transistor combined in the same electric circuit forming a solid state switch.

7. A system for maintaining the integrity of a magnetic force field employed for treating a fluid flowing through the inner portion of a conduit with said magnetic force field where the magnetic force field is generated under adverse environmental conditions, said system including:

(a) a magnetic field generator which includes a plurality of magnets axially aligned relative to said conduit and with respect to each other so as to generate a magnetic force field of discrete magnetic fields, said magnetic force fields extending along and into the inner area of said conduit from the exterior thereof, said magnetic force fields directed substantially transverse to the direction of flow of said fluid flowing through said conduit;

(b) sensor means responsive to changes in conditions characterized by a reduction in the strength of said magnetic force field generated by said generator; and (c) means repsonsive to said sensor means for revising said change in said conditions for restoring said strength of said magnetic force field generated by said generator.

8. The system of claim 7, wherein said magnetic field generator includes at least three magnets and wherein the magnets are polarity oriented so that the magnetic force field created by the first magnet is a south magnetic field, the magnetic field created by the second magnet is north magnetic field, and the magnetic field created by the third magnet is a south magnetic field.

9. The system of claim 8, wherein said sensor means includes means responsive to the magnetic force field generated by said magnetic field generator and wherein said sensor means includes means responsive to a predetermined strength of said magnetic force field.

10. The system of claim 8, wherein said sensor means includes means responsive to changes in temperature and wherein said sensor means includes means responsive to a predetermined temperature.

* * * * *